US009092266B2

(12) United States Patent
Boutin et al.

(10) Patent No.: US 9,092,266 B2
(45) Date of Patent: Jul. 28, 2015

(54) SCALABLE SCHEDULING FOR DISTRIBUTED DATA PROCESSING

(75) Inventors: Eric Boutin, Bellevue, WA (US); James C. Finger, Kirkland, WA (US); Pavel Yatsuk, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 896 days.

(21) Appl. No.: 13/325,052

(22) Filed: Dec. 13, 2011

(65) Prior Publication Data

US 2013/0151707 A1    Jun. 13, 2013

(51) Int. Cl.
*G06F 15/173*   (2006.01)
*G06F 15/16*    (2006.01)
*G06F 9/50*     (2006.01)

(52) U.S. Cl.
CPC ............ *G06F 9/5027* (2013.01); *G06F 9/5077* (2013.01)

(58) Field of Classification Search
CPC .............................. G06F 9/5027; G06F 9/5077
USPC .......................................... 709/224, 226, 229
See application file for complete search history.

(56) References Cited

U.S. PATENT DOCUMENTS

| | | | |
|---|---|---|---|
| 6,086,628 A * | 7/2000 | Dave et al. ................... | 716/105 |
| 6,178,542 B1 * | 1/2001 | Dave ............................. | 716/105 |
| 6,230,303 B1 * | 5/2001 | Dave ............................. | 716/105 |
| 8,413,155 B2 * | 4/2013 | Jackson ........................ | 718/104 |
| 2008/0062886 A1 * | 3/2008 | Tang et al. ................... | 370/252 |
| 2008/0256149 A1 * | 10/2008 | Bansal et al. ................. | 707/206 |
| 2009/0178046 A1 * | 7/2009 | Jain et al. ..................... | 718/104 |
| 2010/0292980 A1 | 11/2010 | Andrade et al. | |
| 2011/0067030 A1 * | 3/2011 | Isard et al. ..................... | 718/102 |
| 2011/0072006 A1 | 3/2011 | Yu et al. | |
| 2011/0234594 A1 * | 9/2011 | Charles et al. ................ | 345/440 |
| 2012/0066667 A1 * | 3/2012 | Mascaro et al. .............. | 717/127 |
| 2012/0131530 A1 * | 5/2012 | Moffitt et al. ................. | 716/113 |
| 2012/0317274 A1 * | 12/2012 | Richter et al. ................ | 709/224 |

OTHER PUBLICATIONS

Murthy, Arun C, "The Next Generation of Apache Hadoop MapReduce", Retrieved at <<http://developer.yahoo.com/blogs/hadoop/posts/2011/02/mapreduce-nextgen/>>, Retrieved Date: Jul. 7, 2011, pp. 5.

(Continued)

*Primary Examiner* — Hieu Hoang
(74) *Attorney, Agent, or Firm* — Aneesh Mehta; Kate Drakos; Micky Minhas

(57) ABSTRACT

A multi-tier scheduling approach includes a first tier comprising virtual cluster allocators that receive scheduling requests from processes and aggregate those requests and provide them to a second tier, namely a single resource distributor for the entire set of computing devices. The resource distributor, based on the requests from virtual cluster allocators, and also from information received from the computing devices themselves, generates a flow graph to identify an optimal scheduling of the assignment of resources to specific ones of the virtual clusters. Each virtual cluster allocator then, based on the assignment of resources assigned to it by the resource distributor, solves its own flow graph to identify an optimal scheduling of processes on the resources assigned. The scheduling of processes is performed iteratively by initially assigning resources to those processes having a high priority, and then, in subsequent iterations, assigning opportunistic resources to those processes having a lower priority.

20 Claims, 8 Drawing Sheets

(56) References Cited

OTHER PUBLICATIONS

Antoniu, Gabriel, "Kerdata, About the project", Retrieved at <<http://www.irisa.fr/kerdata/doku.php?id=mapreduce:start>>, INRIA Rennes—Bretagne Atlantique, Retrieved Date: Jul. 7, 2011, pp. 2.

Hindman, et al., "Mesos: A Platform for Fine-Grained Resource Sharing in the Data Center", Retrieved at <<http://www.eecs.berkeley.edu/Pubs/TechRpts/2010/EECS-2010-87.pdf>>, Electrical Engineering and Computer Sciences, University of California at Berkeley, May 26, 2010, pp. 18.

Gunarathne, Thilina, "Azure MapReduce", Retrieved at <<http://salsahpc.indiana.edu/tutorial/slides/0728/Azure_MapReduce.pdf>>, Salsa group, Indiana University, Retrieved Date: Jul. 7, 2011, pp. 30.

Bu, et al., "HaLoop: Efficient Iterative Data Processing on Large Clusters", Retrieved at <<http://www.cs.washington.edu/homes/magda/papers/bu-vldb10.pdf>>, Proceedings of the 36th international conference on Very Large Data Base, VLDB Endowment, vol. 3, No. 1, Sep. 13-17, 2010, pp. 285-296.

Hindman, et al., "Nexus: A Common Substrate for Cluster Computing", Retrieved at <<http://www.cs.berkeley.edu/~andyk/nexus.pdf>>, Technical Report, UCB/EECS-2009-158, EECS Department, University of California, Berkeley, Nov. 16, 2009, pp. 1-17.

Park, et al., "Predictable Time-Sharing for DryadLINQ Cluster", Retrieved at <<http://www.cs.virginia.edu/~sp2kn/paper/Dryadlinq.pdf>>, Proceeding of the 7th international conference on Autonomic computing (ICAC), Jun. 2010, pp. 175-184.

* cited by examiner

SCALABLE SCHEDULING FOR DISTRIBUTED DATA PROCESSING

BACKGROUND

Not every task that a user seeks to have performed by a computing device can be efficiently performed by that user's personal computing device. Instead, collections of powerful, multi-processor computing devices can provide greater processing capabilities, thereby enabling users to perform tasks that could not efficiently be performed by their personal computing devices, without having to themselves purchase such costly computing hardware. Typically, groups of users share such collections of computing devices such that each user can have access to the collection of computing devices to perform complex and time-consuming data processing. The more users' data processing that can be accommodated by a collection of computing devices, the more value can be realized from such a collection. Consequently, it is desirable to utilize as much of the data processing capability of a collection of computing devices as possible without negatively impacting those users who seek to utilize such collection of computing devices to perform data processing.

Unfortunately, scheduling the processing of users' tasks across multiple computing devices is often not straightforward. For example, some data processing requested by users involves the reading or writing of large quantities of data that may not be able to be efficiently performed if the data processing is being performed by a computing device that is remote from the computer readable storage medium on which such data is to be read from or to be written to. As another example, the data processing requested by users can typically be broken down into individual jobs and processes that can be scheduled individually. If delays are introduced between the performance of one process and the performance of the subsequent process then, over the course of performing a single task, the accumulated delay can quickly become unacceptably large. As yet another example, to provide users with a minimum threshold of service, each user can be guaranteed a certain amount of data processing capability that can be provided by the collection of computing devices. In many cases, however, not every user of the collection of computing devices will be simultaneously utilizing their guaranteed data processing capability. Consequently, in those instances, much of the data processing capabilities of the collection of computing devices can remain unutilized, resulting in underutilization of the overall system, and the attendant inefficiencies that such underutilization introduces. However, were the available processing capability distributed to those users currently desiring it, then it may not be available for other users to whom it was guaranteed.

For small collections of computing devices, the scheduling of processes to be executed by those computing devices can be solved through known mathematical strategies for solving flow graphs. More specifically, each process to be executed can be modeled as a node, or "vertex" in a flow graph, as can each computing device on which such a process could be executed. However, as will be recognized by those skilled in the art, the complexity of such flow graphs, and the efficiency with which they can be solved, is proportional to the number of edges in the flow graph, where each connection between a vertex is an "edge". Thus, for example, were a process agnostic as to the computing device on which it was executed, an edge would exist from such a process to each computing device. The complexity of such a flow graph could, theoretically, be as high as the number of processes to be scheduled multiplied by the number of computing devices on which such processes could be executed. As can be seen, such a flow graph can quickly become too complex to be solved efficiently as the number of computing devices and the number of processes to be scheduled increases beyond a few dozen. Consequently, such an approach is not practical for modern data processing computer clusters that can comprise thousands of computing devices.

SUMMARY

In one embodiment, a multi-tier approach to scheduling the processes to be executed on individual process nodes can be utilized, thereby providing a scheduling solution that can scale to thousands of computing devices without unacceptable delays. Jobs, comprising the processes to be executed, can be associated with "virtual clusters" that can represent a virtual collection of processing capability. Each virtual cluster can, independently of other virtual clusters, schedule processes to execute on the processing resources that are assigned to that virtual cluster. Resources are assigned to virtual clusters by a single resource distributor, which can schedule resources to be utilized by the virtual clusters based on requests received from the virtual clusters.

In another embodiment, a virtual cluster allocator can receive requests for resources from the processes of the jobs that have been assigned to its virtual cluster. The virtual cluster allocator can build a flow graph comprising the jobs and processes of those jobs that are requesting resources and also comprising the computing devices on which it is desirable to execute such processes. The virtual cluster allocator can aggregate the requests for resources into aggregated requests that can be made, by the virtual cluster allocator, to a single resource distributor. A single resource distributor can inform the virtual cluster allocators of the various virtual clusters, which processing resources are currently assigned to which virtual clusters. Utilizing such information, individual virtual cluster allocators can schedule processes to execute specific ones of the computing devices whose processing resources have been assigned to the virtual cluster by the resource distributor.

In a further embodiment, a single resource distributor can receive aggregated requests for processing resources from multiple virtual cluster allocators. The resource distributor can, additionally, receive status information from the computing devices providing the processing resources. Based on such status, and on the requested resources, the resource distributor can, itself, build a flow graph and solve it to identify which resources to assign to which virtual cluster.

In a still further embodiment, scheduling of processes to be executed can be performed iteratively by initially assigning resources to those processes having a high priority, and then, in subsequent iterations, assigning opportunistic resources to those processes having a lower priority. Resources can be grouped into a "static" pool of resources that can be guaranteed to be available for the users to whom they are promised, and a "dynamic" pool of resources that can be scheduled opportunistically.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
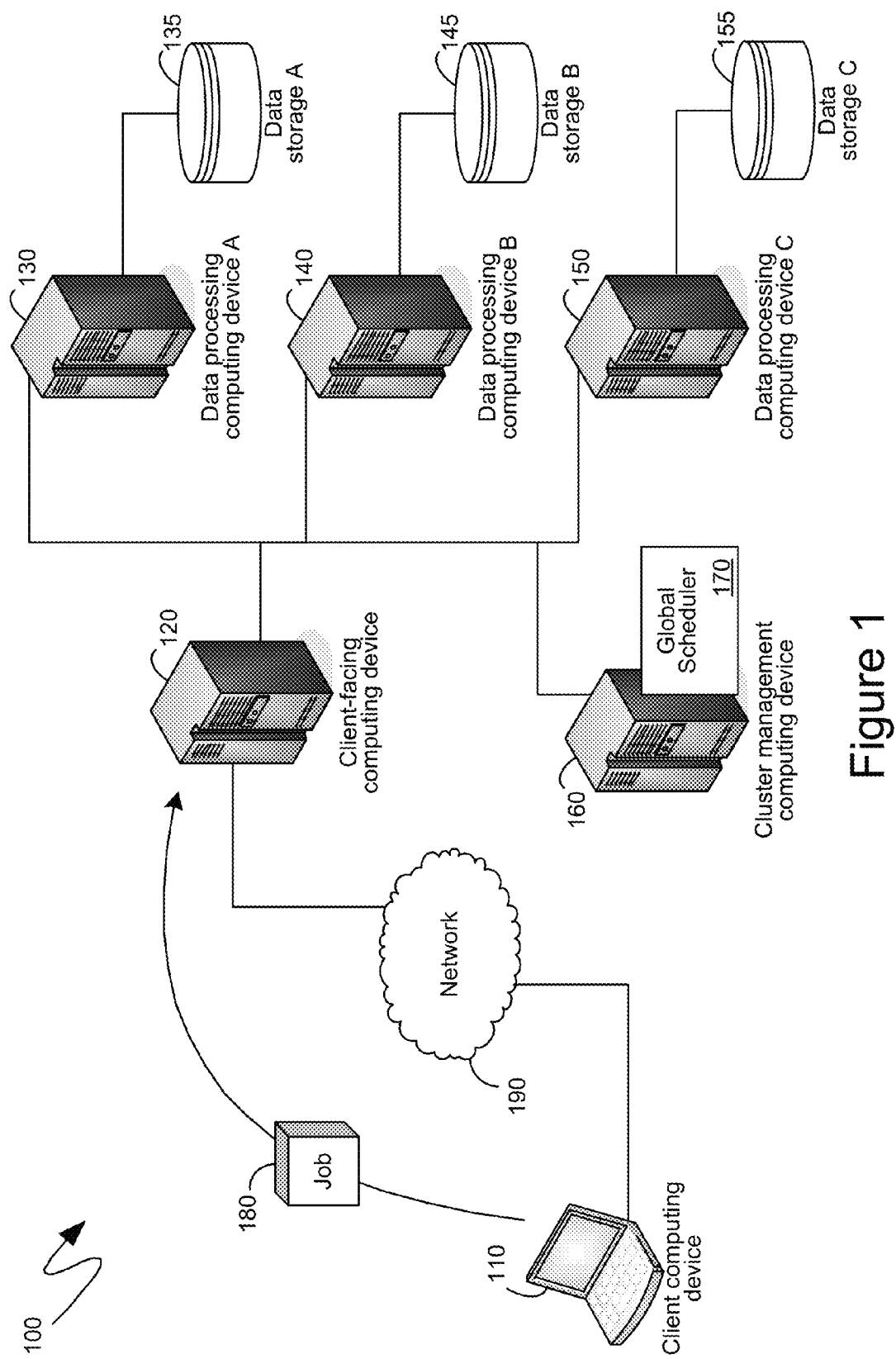
FIG. 1 is a block diagram illustrating an exemplary system for implementing scalable scheduling.

The following description relates to mechanisms for scheduling the execution of processes on execution resources in a manner that is scalable to accommodate thousands of computing devices providing the execution resources. A multi-tier scheduling approach can be utilized, whereby requests for resources are directed to a first tier comprising virtual cluster allocators. A virtual cluster can be a dynamically changing collection of execution resources and processes can be scheduled on a virtual cluster by a virtual cluster allocator. Virtual cluster allocators can act as the first tier of the multi-tier scheduling approach, receiving scheduling requests from processes and aggregating those requests and providing them to a resource distributor that can be a single resource distributor for the entire set of computing devices. The resource distributor can, based on the requests received from various virtual cluster allocators, and also from information received from the computing devices themselves, generate a flow graph to identify an optimal scheduling of the assignment of resources to specific ones of the virtual clusters. Each virtual cluster allocator can, based on the assignment of resources assigned to it by the resource distributor, solve its own flow graph to identify an optimal scheduling of processes on the resources assigned. Such an optimal scheduling may not necessarily be a scheduling where a greatest quantity of processes are scheduled and executed, and each virtual cluster allocator can apply different scheduling strategies, independently of other virtual cluster allocators. The scheduling of processes can be performed iteratively by initially assigning resources to those processes having a high priority, and then, in subsequent iterations, assigning opportunistic resources to those processes having a lower priority. Resources can be grouped into a "static" pool of resources that can be guaranteed to be available for the users to whom they are promised, and a "dynamic" pool of resources that can be scheduled opportunistically.

Although not required, the description below will be in the general context of computer-executable instructions, such as program modules, being executed by one or more computing devices. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, providing context for the descriptions below. Exemplary system 100 can comprise data processing computing devices 130, 140 and 150 that can provide data processing capabilities that exceed those typically available to users through personal computing devices. For example, the data processing computing devices 130, 140 and 150 can represent a portion of a much larger system of computing devices that, in aggregate, can comprise a substantial amount of data processing capabilities. As another example, each of the data processing computing devices 130, 140 and 150 can represent multiprocessor computing systems that can comprise hundreds, or even thousands, of processing units that can operate in parallel, independently of one another. Additionally, the data processing computing devices 130, 140 and 150 are not meant to represent only standalone computing devices but are, instead, intended as a general representation of a device comprising processing capability, including, for example, one or more slots in a rack of server computing devices, or other like computing devices that are not necessarily "standalone".

Typically, data processing computing devices, such as the data processing computing devices 130, 140 and 150, have access to computer-readable media comprising the capability to store data in a computer-readable format, such as the data storage devices 135, 145 and 155. Access to such data storage devices can be through local communication media, which can be utilized when the data storage device is physically co-located with the data processing computing device, or through network communication media, which can be utilized when the data storage device is physically remote from the data processing computing device. For example, the data storage device 135 is illustrated as being locally communicationally coupled to the data processing computing device 130. By contrast, the data processing computing devices 140 and 150 can access the computer readable data stored on the data storage device 135 via network communications, such as via the network 190 to which the data processing computing devices 130, 140 and 150 are communicationally coupled. As will be recognized by those skilled in the art, local communicational connections can provide substantially greater throughput then network communicational connections. Thus, as a result, a data processing computing device can read data from, and write data to, a data storage device that is co-located with that data processing computing device much more quickly then it could with a data storage device with which it had to communicate over a network. From an efficiency perspective, therefore, it can be desirable to schedule processes to execute on a data processing computing device that is co-located with a data storage device on which computer readable data that will be utilized by those processes is stored, since those processes, executing on such a data processing computing device, will be able to access the stored data more quickly. Such a concept is often referred to as "data locality", or a "locality requirement", and the processes described in detail below can take such locality requirements into account in scheduling processes on specific ones of the data processing computing devices.

In addition to the data processing computing devices 130, 140 and 150, and the data storage devices 135, 145 and 155 that are communicationally coupled thereto, respectively, the system 100 of FIG. 1 can also comprise a client facing computing device 120 through which a client utilizing, for example, a client computing device 110, can provide a job 180 to be executed by the data processing computing devices 130, 140 and 150. The job 180 can represent any task, or set of tasks, that a user seeks to have performed by one or more of the data processing computing devices of the system 100. Typically, the job 180 is a data processing task that cannot be efficiently performed by the client computing device 110, either due to an inadequate amount of processing resources on the part of the client computing device 110 or because the data to which the job 180 is directed is not resident on the client computing device 110 but is, instead, resident on a data storage device that is communicationally coupled to one or more of the data processing computing devices of the system 100.

Although only a single client computing device 110 is illustrated, typically the system 100 would comprise many client computing devices and many clients transmitting many jobs to be performed by the data processing computing devices of the system 100. In one embodiment, each client can have a certain amount of data processing capability that can be guaranteed to be available to the client. Typically such guaranteed data processing capability has been purchased, or otherwise reserved by the client. In addition, there can be unused data processing capability that can be provided to a client so long as other clients, to whom the data processing capability was guaranteed, are not currently utilizing it. To schedule the execution of processes and tasks, such as those of the job 180, on the data processing computing devices of the system 100, such that the system 100 is utilized optimally, a cluster management computing device 160 can be part of the system 100 that can comprise a global scheduler 170. Although the cluster management computing device 160 is illustrated in FIG. 1 as being a single, physical computing device, the cluster management computing device 160 is intended to represent any one or more computing devices on which a component of the global scheduler 170 executes. As will be described in further detail below, in one embodiment, different components of the global scheduler 170 are designed to be executed asynchronously across multiple different computing devices, thereby enabling the scheduling of the execution of processes on the data processing computing devices of the system 100 to occur more rapidly and be determined more efficiently.

Figure 2:
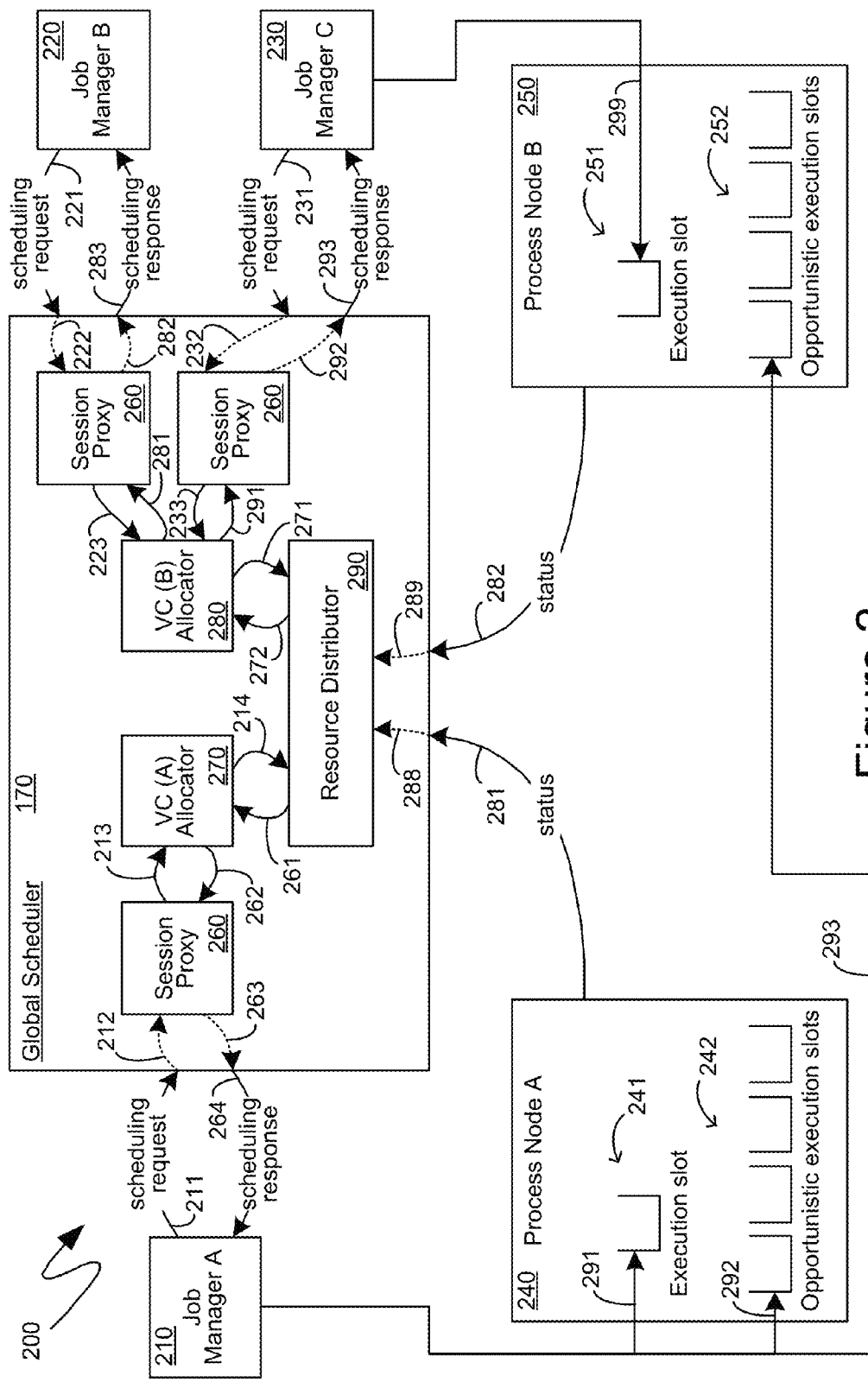
FIG. 2 is a block diagram illustrating an exemplary series of elements for implementing scalable scheduling.

Turning to FIG. 2, the system 200 shown therein illustrates an exemplary series of components of the global scheduler 170 that was previously shown in the system 100 of FIG. 1. In addition to the global scheduler 170, the system 200 can comprise job managers, such as the job managers 210, 220 and 230, which can manage the execution of the job, such as the job 180 that was shown in the system 100 of FIG. 1. Any particular, and as will be recognized by those skilled in the art, job managers can identify the tasks and processes of a job that need to be executed, the order in which they are to be executed, and the resources that are required for their execution. As such, one aspect of a job manager is requesting the scheduling of those processes for execution, and then causing the execution of those processes when they are scheduled. Thus, in the system 200 of FIG. 2, each of the job managers 210, 220 and 230 can submit scheduling requests, such as the scheduling requests 211, 221 and 231, respectively, to the global scheduler 170 and can receive, in response, scheduling responses 264, 283 and 293, respectively, that can enable those job managers to execute the processes of their jobs on a system of data processing computing devices being managed by the global scheduler 170.

Additionally, the system 200 of FIG. 2 also comprises process nodes, such as the process nodes 240 and 250. As utilized herein, the term "process node" means any collection of computing hardware that can perform the execution of computer-executable instructions independently of any other process node. Thus, for example, a single processing unit in a multiprocessor computing device can be a process node, as can a single core in a multicore processing unit. In one embodiment, each process node can comprise an execution slot, such as the execution slot 241 of the process node 240 and the execution slot 251 of the process node 250, that can represent the capability of the process node to execute a process, or other like collection of computer executable instructions. Additionally, each process node can comprise one or more opportunistic execution slots, such as the opportunistic execution slots 242 of the process node 240, and the opportunistic execution slots 252 of the process node 250, that can represent the capability of the process node to execute other processes when the process in the execution slot is not currently executing, such as, for example, when the process in the execution slot has completed execution, or has paused waiting for some other function to be completed. In one embodiment, process nodes, such as the process nodes 240 and 250, can provide status information, such as via the status communications 281 and 282, to the global scheduler 170 including, for example, the status of their respective execution slots and opportunistic execution slots to enable the global scheduler to know what processing resources and capabilities are available for scheduling.

In one embodiment, the global scheduler 170 can comprise a session proxy 260 that can multiplex between the jobs that seek to have processes scheduled for execution by the global scheduler 170 and the virtual cluster allocators generated by the global scheduler 170 to aid in scheduling, such as in the manner described in detail below. In one embodiment, multiple different jobs can be assigned to the same virtual cluster. As such, the session proxy 260 links a job with the virtual cluster allocator for the virtual cluster to which the job is assigned. While illustrated as multiple separate components in the system 200 of FIG. 2, the session proxy 260 can be a single component and is shown as multiple components strictly for ease of illustration. Each of the multiple components labeled "session proxy" in the system 200 of FIG. 2 are assigned the same identifier 260 to indicate that they can represent a single collection of computer-executable instructions.

To schedule the processes of jobs for execution, the global scheduler 170 can, in one embodiment, create virtual clusters of processing resources, such as the process nodes described above. Such clusters are termed "virtual" because the processing resources that comprise such clusters can dynamically change and, consequently, the clusters do not represent a physical collection of computing devices. Each virtual cluster can have processes of the jobs assigned to it scheduled for execution by a virtual cluster allocator such as the virtual cluster allocators 270 and 280 illustrated in the system 200 of FIG. 2. Additionally, the virtual cluster allocators can aggregate the requests of individual jobs into resource requests that the virtual cluster allocators can make of the resource distributor 290. In one embodiment, the resource distributor 290 can schedule the assignment of the processing resources of the system being managed by the global scheduler 170 to individual virtual clusters. Such scheduling of processing resources can then be returned to the virtual cluster allocators which can then, based on the resources that were scheduled for their virtual clusters, respond to the scheduling requests made of them and schedule the processes that are to be executed by the jobs assigned to those virtual clusters.

More specifically, each of the job managers, such as the exemplary job managers 210, 220 and 230 that are illustrated in FIG. 2, make scheduling requests of the global scheduler 170, such as the scheduling requests 211, 221 and 231, respectively, though scheduling requests can be handled by the session proxy 260 and forwarded to the appropriate virtual cluster allocator of the virtual cluster to which the jobs associated with those job managers are assigned. Thus, the scheduling request 211 from the job manager 210 to the global scheduler 170 is received by the session proxy 260, as indicated by the communication 212. The session proxy 260 can then direct that request to the virtual cluster allocator of the virtual cluster to which the job managed by job manager 210 is assigned, namely the virtual cluster allocator 270, as illustrated by the communication 213. In a similar manner, the scheduling request 221 from the job manager 220 can be received by the session proxy 260, as indicated by the communication 222, and the scheduling request 231 from the job manager 230 can be received by the session proxy 260, as indicated by the communication 232. The session proxy 260 can then forward those scheduling requests to the virtual cluster allocator of the virtual cluster to which the jobs managed by the job managers 220 and 230 are assigned, namely the virtual cluster allocator 280, as illustrated by the communications 223 and 233, respectively.

Virtual cluster allocators, such as the virtual cluster allocators 270 and 280 can build a flow graph taking into account the scheduling requests that they have received from the session proxy 260 and can send resource requests to the resource distributor 290, as illustrated by communications 214 and 271, respectively. The resource requests sent by virtual cluster allocators, such as the virtual cluster allocators 270 and 280, to a resource distributor, such as the resource distributor 290, can be aggregates of the scheduling requests that the virtual cluster allocators received from individual job managers, such as the job managers 210, 220 and 230, via the session proxy. For example, as will be described further below, individual scheduling requests from one specific job can be aggregated into a single resource request by a virtual cluster allocator. Similarly, as another example, individual scheduling requests of a same job, each having a same priority level, can be aggregated into a single resource request. The resource distributor 290 can, itself, build a flow graph taking into account these resource requests received from virtual cluster allocators, such as the virtual cluster allocators 270 and 280, and the information it has received regarding the status of the resources available to be scheduled, such as the process nodes 240 and 250. Thus, as shown, the status information sent to the global scheduler 170 by the process nodes 240 and 250, illustrated by the communications 281 and 282, respectively, can be forwarded to the resource distributor 290, as illustrated with the communications 288 and 289, respectively.

Once the resource distributor 290 has constructed a flow graph taking into account the resource requests and the available resources, it can solve the flow graph and, based on such a solution, schedule specific ones of the available resources to be assigned to specific virtual clusters. Subsequently, the resource distributor 290 can inform the virtual cluster allocators associated with the virtual clusters to which the available resources have been scheduled, that those resources have been provided to that virtual cluster. Such information can be provided to the virtual cluster allocators, such as the virtual cluster allocators 270 and 280, by the communications 261 and 272, respectively. Upon receiving information as to which resources have been provided to that virtual cluster, the virtual cluster allocators can appropriately update, and then solve, the flow graphs that they have generated, thereby determining which processes are to be scheduled on which processing resources. Because each virtual cluster allocator, such as the virtual cluster allocators 270 and 280, can operate independently, each virtual cluster allocator can apply its own strategies to determining which processes are to be scheduled on which processing resources without impacting any other virtual cluster allocators. The virtual cluster allocators can then notify the job managers of the jobs to which such processes belong of the processing resources that are being made available to those processes and the job managers can then proceed to execute the processes on the provided processing resources. Thus, for example, the virtual cluster allocator 270 can solve its flow graph, utilizing the information received from the resource distributor 290 via the communication 261, and can determine which processing resources are to be made available to the processes of the job associated with the job manager 210. The virtual cluster allocator 270 can then inform the job manager 210 of those resources being made available to it via the communication 262 to the session proxy 260, which the session proxy 260 can then provide to the job manager 210 via the communications 263 and 264. In a similar manner, the virtual cluster allocator 280 can solve its flow graph, utilizing the information received from the resource distributor 290 via the communication 272, and can determine which processing resources are to be made available to the processes of the jobs associated with the job managers 220 and 230. The virtual cluster allocator 280 can then inform the job managers 220 and 230 of those resources being made available to them via the communications 281 and 291, respectively, to the session proxy 260, which the session proxy 260 can then provide the job managers 220 and 230 the of the communications 282 and 283 and the communications 292 and 293, respectively.

As the various jobs, such as the jobs associated with the job managers 210, 220 and 230, execute the processes on the processing resources that were assigned to them by the global scheduler 170, and complete them, they can provide updated scheduling requests to the global scheduler 170. Similarly, the processing resources being managed by the global scheduled 170, such as the various process nodes, can provide status updates to the global scheduler 170. In such a manner the processing resources available can continuously be scheduled by the global scheduler 170.

Figure 3:
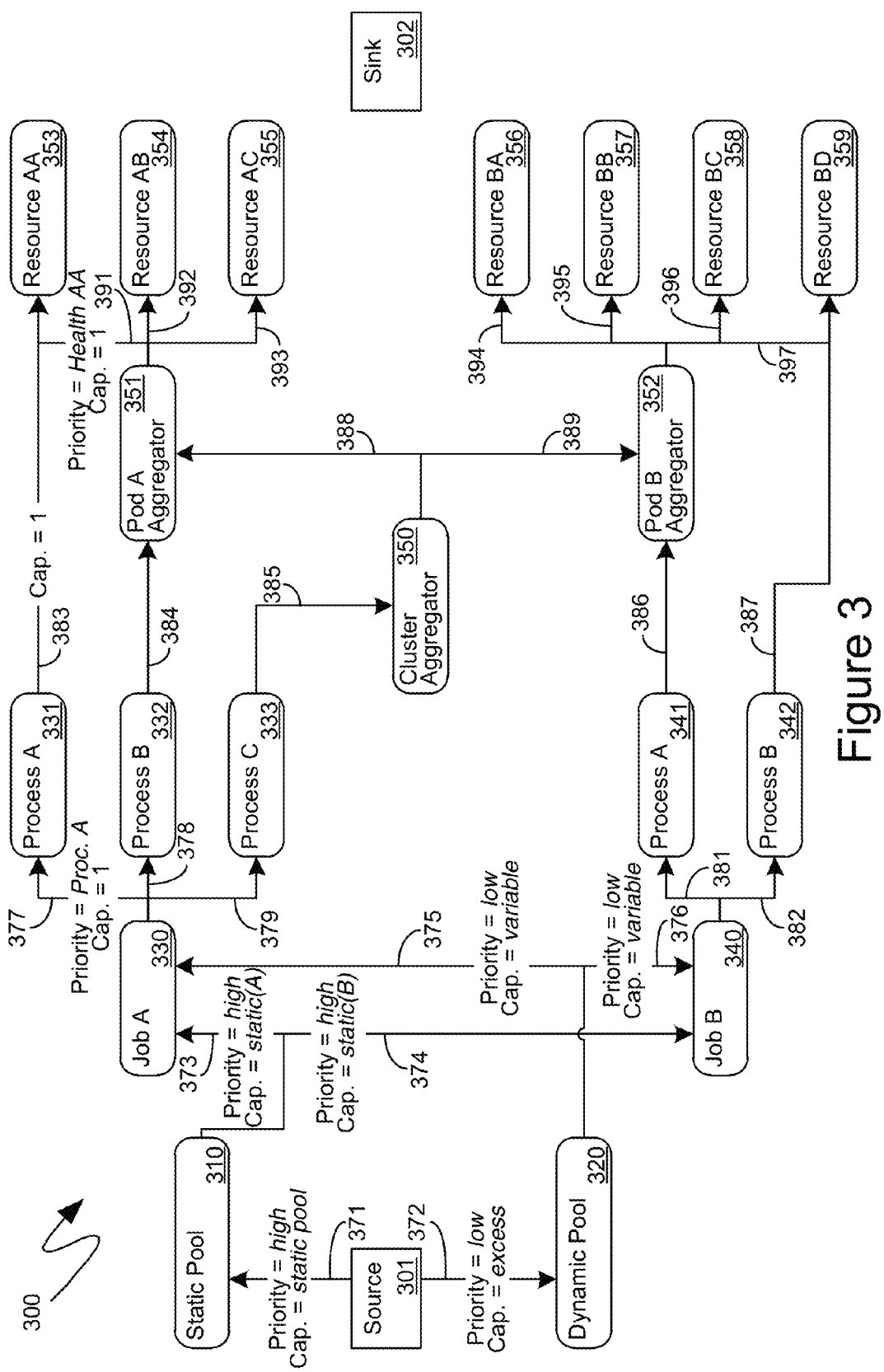
FIG. 3 is a block diagram illustrating an exemplary flow graph that can be generated to determine the scheduling of processes on resources.

Turning to FIG. 3, the flow graph 300 shown therein illustrates an exemplary flow graph that can be constructed by a virtual cluster allocator, such as the virtual cluster allocators 270 and 280 that were illustrated in FIG. 2, in order to schedule processes to execute on various processing resources. As will be recognized by those skilled in the art, the flow graph 300 comprises a source 301 from which flow originates and a sink 302 which flow terminates. As will also be recognized by those skilled in the art, a determination of an optimal flow through the flow graph 300 is known as "solving" the flow graph and is done in accordance with known mathematical flow graph solving techniques. However, as will be described further below, differing constraints can be specified in a flow graph such that the solution to a flow graph can take into account differing process scheduling strategies. Indeed, as indicated previously, because each virtual cluster allocator can build its own flow graph, independently of other virtual cluster allocators, each virtual cluster allocator can apply its own strategy to scheduling processes without impacting, and independently of, any other virtual cluster allocator.

In one embodiment, the source 301 can have edges 371 and 372 to a static pool 310 and a dynamic pool 320, respectively. The static pool 310 can represent the amount of processing resources that can have been guaranteed to users of the computing system whose resources are being scheduled, while the dynamic pool 320 can represent the processing resources that are currently not being utilized, such as, for example, by another user to whom they were guaranteed. As will be recognized by those skilled in the art, the edges of a flow graph can each comprise a capacity. For purposes of constructing a flow graph, such as the flow graph 300, a virtual cluster allocator can assign a capacity to the edge between the source and the static pool that is equivalent to the amount of guaranteed resources that are still available, and not otherwise utilized, from among the guaranteed resources that were guaranteed to the users of the jobs assigned to the virtual cluster associated with that virtual cluster allocator. Thus, for example, for the flow graph 300, which can exemplarily comprise two jobs, namely jobs 330 and 340, the capacity of the edge 371 between the source 301 and the static pool 310 can be the quantity of guaranteed resources that were guaranteed to the users initiating the jobs 330 and 340 that have not already been utilized by the jobs 330 and 340. Additionally, a virtual cluster allocator can assign a capacity to the edge between the source and the dynamic pool that is variable and is designed to prevent jobs from being assigned too many resources and is also designed to limit the impact of assignments from the dynamic pool 320 from adversely impacting subsequent assignments from the static pool 310.

In generating a flow graph, such as the exemplary flow graph 300 shown in FIG. 3, a virtual cluster allocator can create nodes representing each of the jobs to be granted resources from the resource pool that represents the virtual cluster associated with the virtual cluster allocator such as, for example, the job node 330 and the job node 340. Each of the jobs can then have edges from the static pool 310 and the dynamic pool 320 to those jobs. For example job node 330 can have an edge 373 from the static pool 310 and another edge 375 from the dynamic pool 320. Similarly, job node 340 can have an edge 374 from the static pool 310 and an edge 376 from the dynamic pool 320. In one embodiment, jobs can be specified by users to be scheduled only utilizing the static pool 310 such as, for example, if a user prefers predictability rather than speed. In such an embodiment, the job node representing such a job need not have any edge between the dynamic pool 320 and that job node.

The edges between the static pool 310 and the dynamic pool 320 and the job nodes, such as the job nodes 330 and 340, can have a capacity that is uniquely determined for each job and represents the difference between the quantity of resources from each of the pools the job can be assigned and the quantity of resources from each of the pools that the job is currently assigned. Thus, as a specific example, if the job represented by the job node 330 was guaranteed one computing resource, and that job had as yet to utilize any processing resources, then the edge 373 from the static pool 310 to the job node 330 can be assigned a capacity of one by the virtual cluster allocator. Conversely, the job represented by the job node 330 was guaranteed one computing resource and that job was already executing a process utilizing that computing resource, then the edge 373 could have a capacity of zero assigned to it by the virtual cluster allocator.

In addition to assigning a capacity to each edge of a flow graph, such as the exemplary flow graph 300 of FIG. 3, a virtual cluster allocator can also, in one embodiment, assign a priority to one or more edges of the flow graph such that, when searching for a solution to the flow graph, the graph depth is traveled first, commencing with those edges that are assigned a higher priority. The edge 371 from the source 301 to the static pool 310, and the edges 373 and 374 from the static pool 310 to the job nodes 330 and 340 can have a high priority, while the edge 372 from the source 301 to the dynamic pool 320, and the edges 375 and 376 from the dynamic pool 322 the job notes 330 and 340 can have a low priority.

In generating a flow graph, such as the exemplary flow graph 300 shown in FIG. 3, a virtual cluster allocator can create nodes representing each of the processes of a job for which processing resources are currently being requested. Thus, for example, the exemplary flow graph 300 can comprise five processes, namely the processes represented by the process nodes 331, 332 and 333, that are part of the job represented by the job node 330 and another two processes, namely the processes represented by the process nodes 341 and 342, that are part of the job represented by the job node 340. In each case, the process nodes can be connected with edges to the job nodes associated with the jobs of which those processes are a part, and each of those edges can have a capacity of one. Thus, for example, the process node 331 can be connected to the job node 330 via the edge 377, the process node 332 can be connected to the job node 330 via the edge 378 and the process node 333 can be connected to the job node 330 via the edge 379. In a similar manner, the process node 341 can be connected to the job node 340 via the edge 381 and the process node 342 can be connected to the job node 340 via the edge 382.

While each of the edges between a job node and the process nodes corresponding to the processes of that job can have a capacity of one, their priorities may not be equal. Instead, each edge from a job node to a process node can have a priority equal to that of the priority of the process represented by that process node. Thus, for example, the edge 377 from the job node 330 to the process node 331 can have a priority equal to the priority assigned to the process associated with the process node 331. The other edges 378, 379, 381 and 382 can, likewise, have priorities corresponding to the priorities assigned to the processes associated with the process nodes 332, 333, 341 and 342, respectively.

In one embodiment, the flow graph generated by a virtual cluster allocator can comprise a representation of a network arrangement of computing devices that provide the processing resources currently requested by jobs that have been assigned to the virtual cluster associated with the virtual cluster allocator. For example, the exemplary flow graph 300 shown in FIG. 3 can include nodes that represent a network arrangement of computing devices such as, for example, the cluster allocator node 350 that can represent the overall cluster of computing devices, the pod aggregator nodes 351 and 352 that can each, individually, represent a pod, or other similar collection of computing devices, and individual resource nodes 353, 354, 355, 356, 357, 358 and 359 that can each, individually, represent a processing resource such as, for example, a single computing device, a single processing unit within a computing device, or even a single core of a multi-core processor. In the latter case, a pod aggregator node, such as one of the pod aggregator nodes 351 and 352 can even represent a collection of non-uniform memory access nodes, and need not represent a physically delineated collection of computing devices.

Such nodes can, then, represent the network arrangement of the computing devices by the edges that are generated to connect such nodes. In particular, the edges between the cluster allocator node 350, the pod aggregator nodes 351 and 352 and the processing resource nodes 353 through 359 can be based on the network arrangement of the computing devices representing the processing resource nodes 353 through 359. For example, the resource nodes 353, 354 and 355 can all be provided by one or more computing devices that are part of a single pod of computing devices. Consequently, a node can be created by the virtual cluster allocator that can represent such a pod of computing devices, such as, for example, the pod aggregator node 351. The virtual cluster allocator can then, in generating a flow graph, such as the exemplary flow graph 300, create edges between the pod aggregator 351 and each of the processing resource nodes 353, 354 and 355 that can represent the computing devices of that pod. For example, the edge 391 can connect the pod aggregator node 351 to the resource node 353, the edge 392 can connect the pod aggregator node 351 to the resource node 354 and the edge 393 can connect the pod aggregator node 351 to the resource node 355. In a similar manner, the edges 394, 395, 396 and 397 can connect to the pod aggregator node 352 with the resource nodes 356, 357, 358 and 359, respectively, indicating that the pod of computing devices represented by the pod aggregator node 352 comprises the computing devices that provide the processing resources represented by the resource nodes 356, 357, 358 and 359. Edges 388 and 389 can then be created between the cluster allocator node 350 and each of the pod aggregator nodes 351 and 352, thereby enabling the cluster allocator node 350 to represent, as a single node, all of the computing devices that can provide processing resources that can be assigned to the virtual cluster.

In one embodiment, the health of various computing devices and other like computing hardware providing the processing resources represented by the processing resource nodes can be monitored. To minimize the chances that important processes are scheduled for execution on processing resources whose health may be in question and which may fail, or may otherwise be incapable of completing the execution of the processes, a priority can be assigned to the edges leading to the resource nodes that is indicative of the health of the computing devices providing the processing resources represented by those resource nodes. In particular, computing devices that are deemed to be less healthy, or more likely to fail, can have a lower priority assigned to the edges terminating at the resource nodes representative of the processing resources provided by such computing devices, while computing devices that are deemed to be more healthy, or less likely to fail can have a higher priority assigned to the edges terminating at the resource nodes representative of the processing resources provided by such computing devices. For example, as illustrated by the exemplary flow graph 300 of FIG. 3, the edge 391 can have a priority assigned to it that is representative of the health of the computing device providing the processing resource that is represented by the resource node 353. The edges 392, 393, 394, 395, 396 and 397 can, likewise, have analogous priorities assigned to them, although they are not shown in FIG. 3 to maintain illustrative simplicity.

To represent data locality requirements, such as those described in detail above, or other preferences by processes as to on which computing device they desire to execute, a virtual cluster allocator can, in generating a flow graph, generate edges between process nodes and resource nodes. For example, in the exemplary flow graph 300 shown in FIG. 3, the process represented by the process node 331 can have a data locality requirement such that is most efficient for the process represented by the process node 331 to execute on the computing device providing the processing resource represented by the resource node 353. Such a data locality requirement can have been expressed, such as by a job manager associated with the job that is associated with the job node 330, and can be represented, by a virtual cluster allocator to which such a locality requirement, and associated scheduling request, were directed in the form of an edge 383 between the process node 331 and the resource node 353. Similarly, the process represented by the process node 342 can seek to execute only on the computing device providing the processing resource that is represented by the resource node 359, and the virtual cluster allocator, in generating a flow graph, such as the exemplary flow graph 300, can create an edge 387 between the process node 342 and the resource node 359 to represent such a locality requirement.

In some embodiments, processes need not execute on a specific computing device or a specific processing node but can, instead, execute on any one of a number of different computing devices all of which can be equally appropriate. For example, computing devices that are individual blades in a rack of computing devices that each have an equal ability to access data stored on computer-readable storage media within the same rack. In such an example, each of those computing devices would be equally applicable to executing a process that utilizes data stored on the computer readable storage media that are within the same rack as those computing devices. However, other computing devices that can also be part of the same cluster such as, for example, computing devices on another rack may not be able to access data from a different rack as efficiently and, as such, can be sub optimal. In such cases, a virtual cluster allocator can generate an edge from a process node, not to an individual processing resource node, but rather to an aggregate node that can represent a collection of computing devices, such as a rack of computing devices, or other like physical delineation of computing devices. For example, the process represented by the process node 332 can desire to be executed by any one of the processing resources represented by the resource nodes 353, 354 and 355. Were the virtual cluster allocator to generate edges from the process node 332 to each of the resource nodes 353, 354 and 355 separately, the complexity of the flow graph 300 could increase exponentially, thereby, likewise, increasing the amount of time and processing resources that would be required to solve such a flow graph. Thus, instead, in one embodiment, the virtual cluster allocator can generate a single edge 384 from the process node 332 to the pod aggregator node 351, thereby enabling the process corresponding to the process node 332 to be scheduled on any one of the processing resources that are part of the pod represented by the pod aggregator node 351. In a similar manner, the virtual cluster allocator can generate a single edge 386 from the process node 341 to the pod aggregator 352.

If a process is not associated with any data locality requirements such that the process can be executed equally efficiently on any computing resource, an edge can be created by the virtual cluster allocator in a flow graph, such as the exemplary flow graph 300, between a process node representing such a process and a single node that can represent all of the processing resources available to the virtual cluster with which the virtual cluster allocator is associated. Thus, for example, in the exemplary flow graph 300 of FIG. 3, the virtual cluster allocator generating such a flow graph can generate an edge 385 from the process node 333 to the cluster allocator node 350 if the process associated with the process node 333 comprises no data locality requirements. In such a manner, the quantity of edges in the flow graph generated by the virtual cluster allocator, such as the exemplary flow graph 300 of FIG. 3, can remain at a minimum. Since, as will be recognized by those skilled in the art, the computational time required to solve a flow graph is proportional to the quantity of edges in the graph, the reduction of edges of an order of magnitude, such as that described in detail above, can provide for the determination of a solution of a flow graph, such as the flow graph 300 of FIG. 3, orders of magnitude more efficiently.

As will be recognized by those skilled in the art, the exemplary flow graph 300 of FIG. 3 cannot be solved because there is no edge from a node of the flow graph 300 to the sink 302, thereby preventing "flow" through the flow graph 300. In one embodiment, the determination of which of the processing resources represented by the resource nodes 353 through 359 will be assigned to the virtual cluster whose virtual cluster allocator generated the flow graph 300 can be made by a resource distributor, such as the resource distributor 290 shown in FIG. 2. Once such a determination is made, specific ones of the processing resources represented by the resource nodes 353 through 359 can be assigned to the virtual cluster whose virtual cluster allocator generated the flow graph 300. Subsequently, that virtual cluster allocator can update the exemplary flow graph 300 to include edges, to the sink 302, from the resource nodes of the resources that have been assigned to it, thereby enabling the solution of the exemplary flow graph 300, which can, in turn, determine which processes are to be scheduled on specific ones of the processing resources.

In one embodiment, a virtual cluster allocator can construct one or more resource requests that the virtual cluster allocator can send to the resource distributor. Such resource requests can comprise communication of a priority level, a quantity of high priority processing resources that are being requested, a total number of processing resources that are being requested and the specific computing devices or other like supporting hardware from which such processing resources are being requested. More specifically, processing requests made for the processes of a single job, such as the processes represented by the process nodes 331, 332 and 333, can be aggregated, by the virtual cluster allocator, into a single resource request that can be sent, by the virtual cluster allocator, to the resource distributor. Thus, utilizing the exemplary flow graph 300 shown in FIG. 3 as an example, the virtual cluster allocator that generated such a flow graph could generate and transmit at least two resource requests to the resource distributor, namely one for the job represented by the job node 330, and another for the job represented by the job node 340. In one embodiment, to the extent that different processes of a single job have different priorities, such different processes can be broken out into different resource requests by the virtual cluster allocator. For example, if the process represented by the process node 331 in the exemplary flow diagram 300 was a high priority process, while the processes represented by the process nodes 332 and 333 were lower priority processes, then, for the job represented by the job node 330, the virtual cluster allocator could generate two different resource requests to transmit to the resource distributor.

Figure 4:
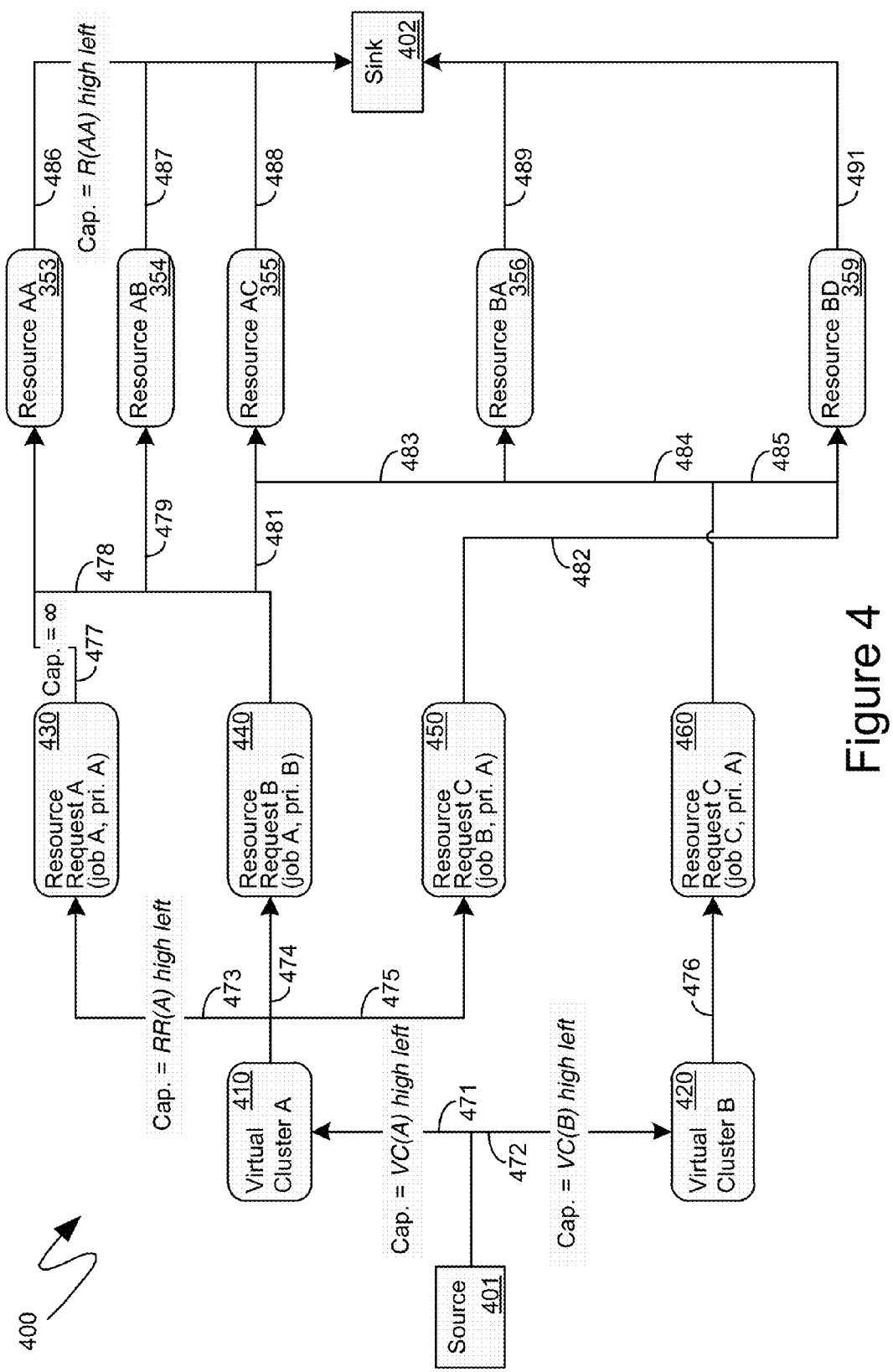
FIG. 4 is a block diagram illustrating another exemplary flow graph that can be generated to determine the scheduling of processes on resources.

When a resource distributor receives resource requests from virtual cluster allocators, the resource distributor can generate its own flow graph to determine which processing resources to assign to each of the virtual clusters. Turning to FIG. 4, the exemplary flow graph 400 shown therein illustrates one example of a flow graph that can be generated by a resource distributor based on resource requests received from virtual cluster allocators. As with the exemplary flow graph 300 illustrated in FIG. 3, the exemplary flow graph 400 of FIG. 4 comprises a source 401 and a sink 402. In the specific example shown, the resource distributor can be distributing resources to two virtual clusters, namely the virtual clusters represented by the virtual cluster nodes 410 and 420 in the exemplary flow graph 400.

Edges 471 and 472 can connect the source 401 to the nodes 410 and 420, respectively, that represent the two virtual clusters. In one embodiment, the capacity, in a flow graph generated by the resource distributor, of edges that connect the source of the flow graph to nodes representing virtual clusters can be equivalent to a quantity of high priority processing resources available to a virtual cluster but that have not yet been utilized by that virtual cluster. Thus, for example, in the exemplary flow graph 400, the edge 471 can have a capacity that is equivalent to the amount of high priority processing resources that have not yet been utilized by the jobs being executed by the virtual cluster associated with the virtual cluster node 410. Similarly, the edge 472 can have a capacity that is equivalent to the amount of high priority processing resources that have not yet been utilized by the jobs being executed by the virtual cluster that is associated with the virtual cluster node 420.

From each of the virtual cluster nodes, such as the virtual cluster nodes 410 and 420 in the exemplary flow graph 400, a resource distributor can generate edges to the resource requests received from the virtual clusters represented by those virtual cluster nodes. For example, the virtual cluster represented by the virtual cluster node 410 can have provided, to the resource distributor, three different resource requests that can be represented by the resource request nodes 430, 440 and 450. Two of those resource requests can have been for the same job, except with different priority levels. More specifically, the virtual cluster allocator generating such resource requests can have received resource requests from processes that are part of that single job where some of those processes had, for example, a high priority while others of those processes had, for example, a low priority. Consequently, the virtual cluster allocator can aggregate the resource requests from the processes of that job that have a high priority into a single resource request such as, for example, the resource request represented by the resource request node 430 in the exemplary flow graph 400 of FIG. 4, and can aggregate the resource requests from the processes of the same jobs that have a low priority into another, single resource request such as, for example, the resource request represented by the resource request node 440. For purposes of illustration, the virtual cluster allocator of the virtual cluster represented by the virtual cluster node 410 can also have sent a resource request aggregating the resources requested by the processes of another, different job, which can be represented by the resource node 450. Similarly, for purposes of illustration, the virtual cluster allocator of the virtual cluster represented by the virtual cluster node 420 can also have sent a resource request, this one aggregating the resources requested by the processes of a job that was assigned to that virtual cluster, and that resource request can be represented by the resource request node 460 in the exemplary flow graph 400 of FIG. 4.

The resource request nodes 430, 440, 450 and 460 can have edges connecting them to the virtual cluster nodes representing the virtual clusters from which such resource requests were received, namely the virtual cluster nodes 410 and 420. Thus, for example, in the exemplary flow diagram 400 of FIG. 4, an edge 473 can connect the virtual cluster node 410 to the resource request node 430 that was received from the virtual cluster allocator of the virtual cluster represented by the virtual cluster node 410. In a similar manner the resource request node 440 can have an edge 474 connecting it to the virtual cluster node 410 and the resource request node 450 can have an edge 475 connecting it to the virtual cluster node 410. The resource request represented by the resource request node 460 can have an edge 476 to the virtual cluster node 420 that represents the virtual cluster that transmitted that resource request.

In one embodiment, the capacities of the edges between a virtual cluster node and the resource request node can be equivalent to the amount of high priority processing resources that are available to, and have not yet been utilized by, the resource request represented by the resource request node. Thus, for example, the job whose resource requests have been aggregated into the resource request represented by the resource request node 430 can be allowed to consume a certain quantity of high priority processing resources. Some of those high priority processing resources can have already been consumed by the processes of that job whose requests are aggregated into the resource request represented by the resource request node 430. The difference between these two values can be the capacity assigned to the edge 473 between the virtual cluster node 410 and the resource request node 430 that represents the resource request aggregating the requests of those processes. In a similar manner, the edge 474 can have a capacity equivalent to the remaining high priority resources available to the processes whose requests are aggregated in the resource request represented by the resource request node 440, and the edge 475 can have a capacity equivalent to the remaining high priority resources available to the processes whose requests are aggregated in the resource request represented by the resource request node 450. Likewise, the edge 476 can have a capacity equivalent to the remaining high priority resources available to the processes whose requests are aggregated in the resource request represented by the resource request node 460.

Based on the processing resources specified by the various resource requests received by the resource distributor, the flow graph constructed by the resource distributor can generate edges between the nodes that represent those resource requests and nodes that represent processing resources requested by those resource requests. For example, in the exemplary flow graph 400 of FIG. 4, an edge 477 can be generated between the resource request node 430 and the resource node 353 indicating that the processes whose resource requests were aggregated into the resource request represented by the resource request node 430 requested processing resources from the resource represented by the resource node 353. Similarly, the resource request node 440 can have edges 478, 479 and 481 connecting it to the resource nodes 353, 354 and 355, respectively. Similarly, the resource request node 450 can have an edge 482 connecting it to the resource node 359, and the resource request node 460 can have edges 483, 484 and 485 connecting it to the resource nodes 355, 356 and 359, respectively. In one embodiment, the capacity of the edges between resource request nodes and resource nodes can be infinite.

Each of the resource nodes, such as the exemplary resource nodes 353, 354, 355, 356 and 359 can have edges from them to the sink of the flow graph constructed by the resource distributor such as, for example, the edges 486, 487, 488, 489 and 491, respectively in the exemplary flow graph 400 of FIG. 4. The edges between resource nodes and the sink can have a capacity that is equivalent to a quantity of high priority processes that can be scheduled on the processing resource associated with the resource node. Thus, for example, if the processing resource associated with the resource node 353 can only execute one high-priority process at a time, and it is already executing such a high priority process, then the capacity of the edge 486 can be set to zero. Conversely, if the processing resource associated with the resource node 353 can execute two high-priority processes at a time, and it is only executing one such high-priority process, then the capacity of the edge 486 can be set to 1. Information regarding the processing resources represented by the resource nodes 353, 354, 355, 356 and 359, such as, for example, whether those processing resources are currently executing any high-priority processes, can be received from the processing resources themselves, such as in the form of the status communications 281 and 282 that were received by the global scheduler 170 from the process nodes 240 and 250, as shown in the system 200 of FIG. 2. In such a manner, capacities can be assigned to all of the edges between resource nodes and the sink in the flow graph generated by the resource distributor, such as the edges 486, 487, 488, 489 and 491 in the exemplary flow graph 400 of FIG. 4.

The flow graph generated by the resource distributor, such as the exemplary flow graph 400 of FIG. 4, can comprise edges from the source 401 to the sink 402, thereby enabling the solution of the flow graph, as will be recognized by those skilled in the art. Such a solution can then inform which resources are to be assigned to which virtual clusters, and the resource distributor can so inform the virtual cluster allocators of those virtual clusters. For example, if the solution of the exemplary flow graph 400 includes a flow from the source 401 through the virtual cluster node 410, the resource request node 430 and the resource node 353 to the sink 402, then the resource distributor can, at this iteration, assign the processing resource represented by the resource node 353 to the virtual cluster represented by the virtual cluster node 410. In one embodiment, the resource distributor can perform multiple, iterative solutions of the flow graph generated, such as the exemplary flow graph 400, each time updating the flow graph in accordance with the resources that were distributed with the prior solution.

Figure 5:
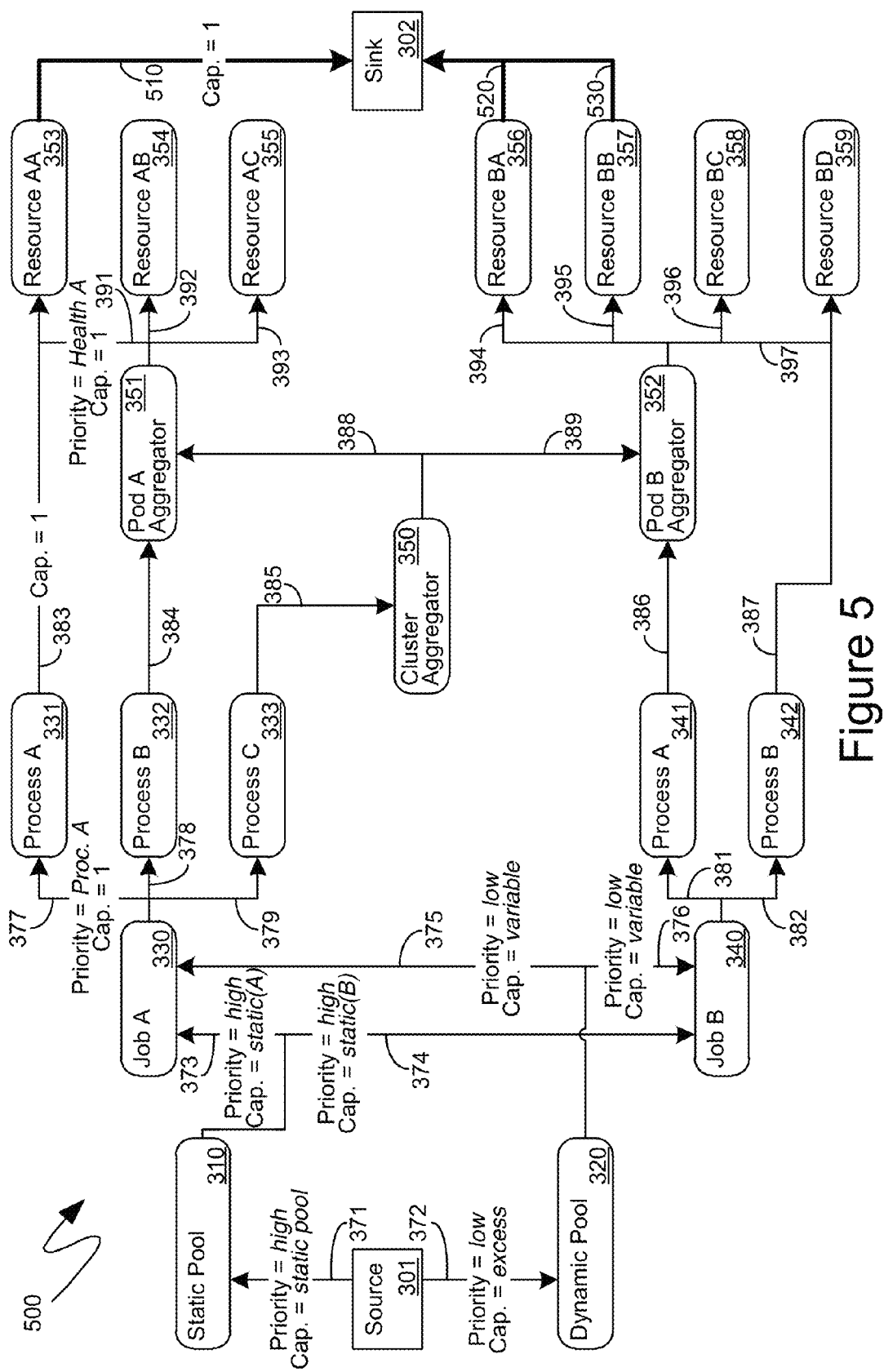
FIG. 5 is a block diagram illustrating an updated exemplary flow graph that can be utilized to determine the scheduling of processes on resources.

Once the virtual cluster allocators receive information regarding which resources have been assigned to the virtual clusters associated with those virtual cluster allocators, the virtual cluster allocators can update the flow graphs that they constructed, such as the exemplary flow graph 300 described in detail above and shown in FIG. 3, in order to add edges between the resource nodes representing the resources that have been assigned to that virtual cluster and the sinks of those flow graphs. For example, the exemplary flow graph 300 of FIG. 3 is shown again as the exemplary flow graph 500 of FIG. 5 except that, in the exemplary flow graph 500 of FIG. 5 the virtual cluster allocator generating such a flow graph can have received, such as from a resource distributor, information that certain resources have been assigned the virtual cluster associated with that virtual cluster allocator. Those resources can be represented by edges connecting resource nodes representing those resources to the sink of the flow graph. Thus, for example, and turning to FIG. 5, the exemplary flow graph 500 shown therein comprises edges 510, 520 and 530 from the resource nodes 353, 356 and 357, respectively, to the sink 302 of the exemplary flow graph 500. The edges 510, 520 and 530 can have been added because the processing resources associated with the resource nodes 353, 356 and 357, respectively, can have been assigned to the virtual cluster associated with the virtual cluster allocator constructing the exemplary flow graph 500. With the addition of the edges 510, 520 and 530, the exemplary flow graph 500 can be solved, as will be recognized by those skilled in the art. Its solution can be the basis by which the virtual cluster allocator, which generated the exemplary flow graph 500, assigned specific processing resources to specific processes, and informed the job managers associated with the jobs whose processes have been assigned those resources that the resources have been assigned, thereby enabling the job managers to proceed to execute those processes on the assigned resources. As indicated previously, virtual cluster allocators can iteratively solve the flow graphs they have generated so as to distribute resources from the dynamic pool. More specifically, an initial solution of a flow graph can distribute resources from the static pool, while subsequent, iterative solutions can distribute a greater quantity of resources from the dynamic pool.

Figure 6:
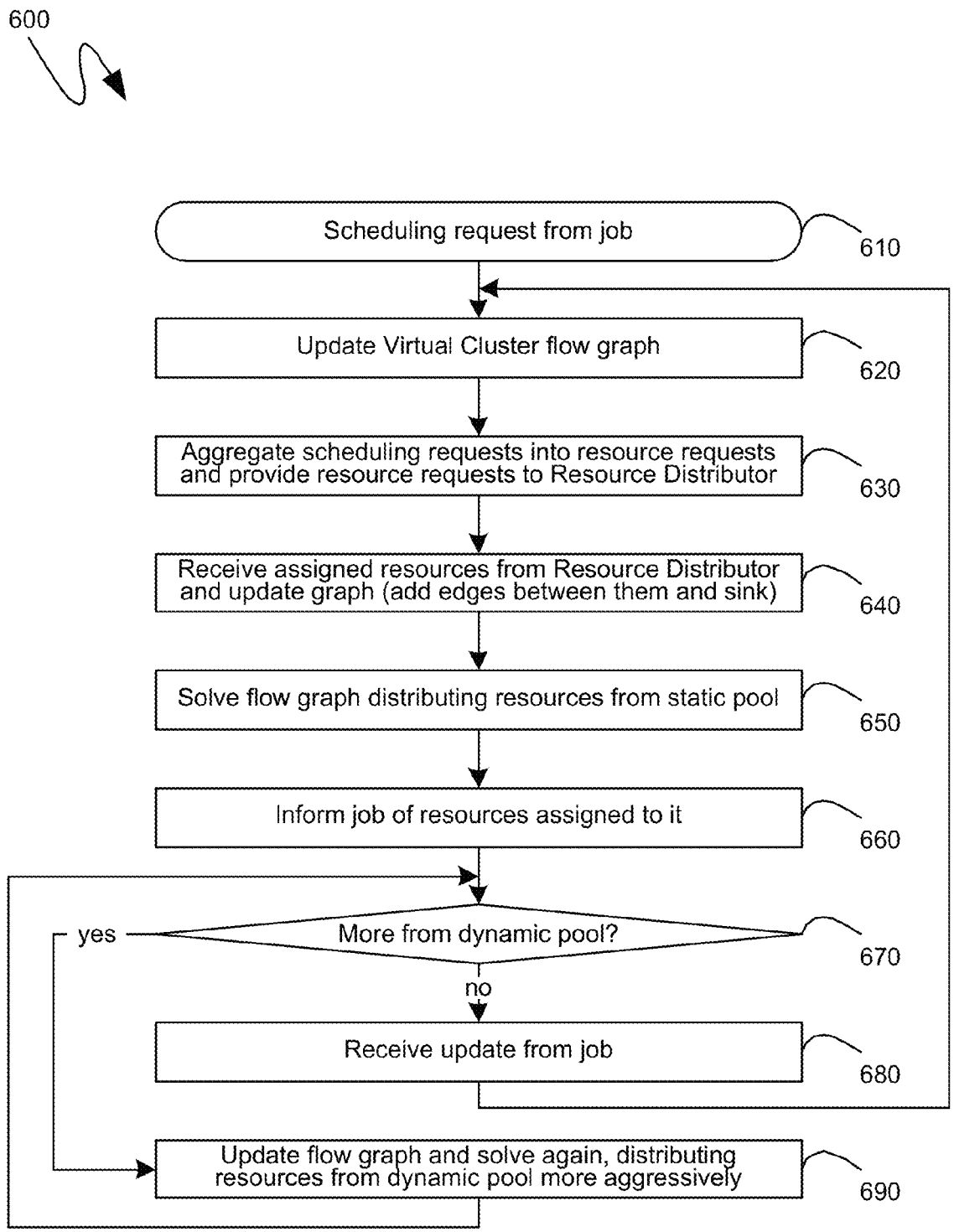
FIG. 6 is a flow diagram of an exemplary operation of one tier of a scalable scheduler.

Turning to FIG. 6, the operation of a virtual cluster allocator is illustrated via the steps of the flow diagram 600 shown in FIG. 6. Initially, at step 610, a virtual cluster allocator can receive scheduling requests from one or more jobs that have been assigned to the virtual cluster associated with the virtual cluster allocator. At step 620 a virtual cluster flow graph can either be generated, if one did not exist previously, or a prior virtual cluster flow graph can be updated in accordance with the requests that were received at step 610, such as in the manner described in detail above. At step 630, the scheduling requests received at step 610, and those received previously that have still not been responded to with processing resources, can be aggregated into resource requests, such as in the manner described in detail above, and can be provided to the resource distributor. Subsequently, at step 640 the resource distributor can return, to the virtual cluster allocator, information regarding which resources have been assigned to the virtual cluster associated with the virtual cluster allocator. In response, the virtual cluster allocator can add edges between the resource nodes representing those resources in the flow graph of step 620 and the sink of that flow graph.

At step 650 the flow graph that was generated or updated at step 620 can be solved since, at step 640, edges can have been added, to the sink, from the resource nodes representing the resources that were assigned to the virtual cluster. The solution of the flow graph, at step 650, can identify the resources that are to be assigned to specific ones of the jobs from whom scheduling requests were received, such as the scheduling request received at step 610. The job managers associated with those jobs can be informed of the assigned resources at step 660.

In one embodiment, processing can proceed to determine, at step 670, whether to distribute further resources from the dynamic pool. As indicated previously, in making the determination, at step 670, as to whether to distribute further resources from the dynamic pool, a virtual cluster allocator can balance a desire to utilize the processing capabilities of the processing resources assigned to the virtual cluster associated with the virtual cluster allocator with the need to retain some of those processing capabilities, should they be desired by the users to whom they were guaranteed and who expect them to be available. If, at step 670, it is determined not to distribute further resources from the dynamic pool, then the virtual cluster allocator can receive updates from jobs as processes of those jobs complete their executions and can then return to step 620 where the flow graph generated by the virtual cluster allocator can be updated with the updates received at step 680, as well as any additional scheduling requests that can be received at step 610. Conversely, if, at step 670, it is determined that additional resources can be distributed from the dynamic pool, the flow graph of step 620 can be updated, at step 690, to account for the resources that were distributed at step 660, and can be solved again, this time distributing resources from the dynamic pool more aggressively. Processing can then return to step 670 to determine whether yet more resources from the dynamic pool are to be distributed. In such a manner, virtual cluster allocators can distribute resources to the processes of jobs that are assigned to the virtual clusters of processing resources that are managed by the virtual cluster allocators.

Figure 7:
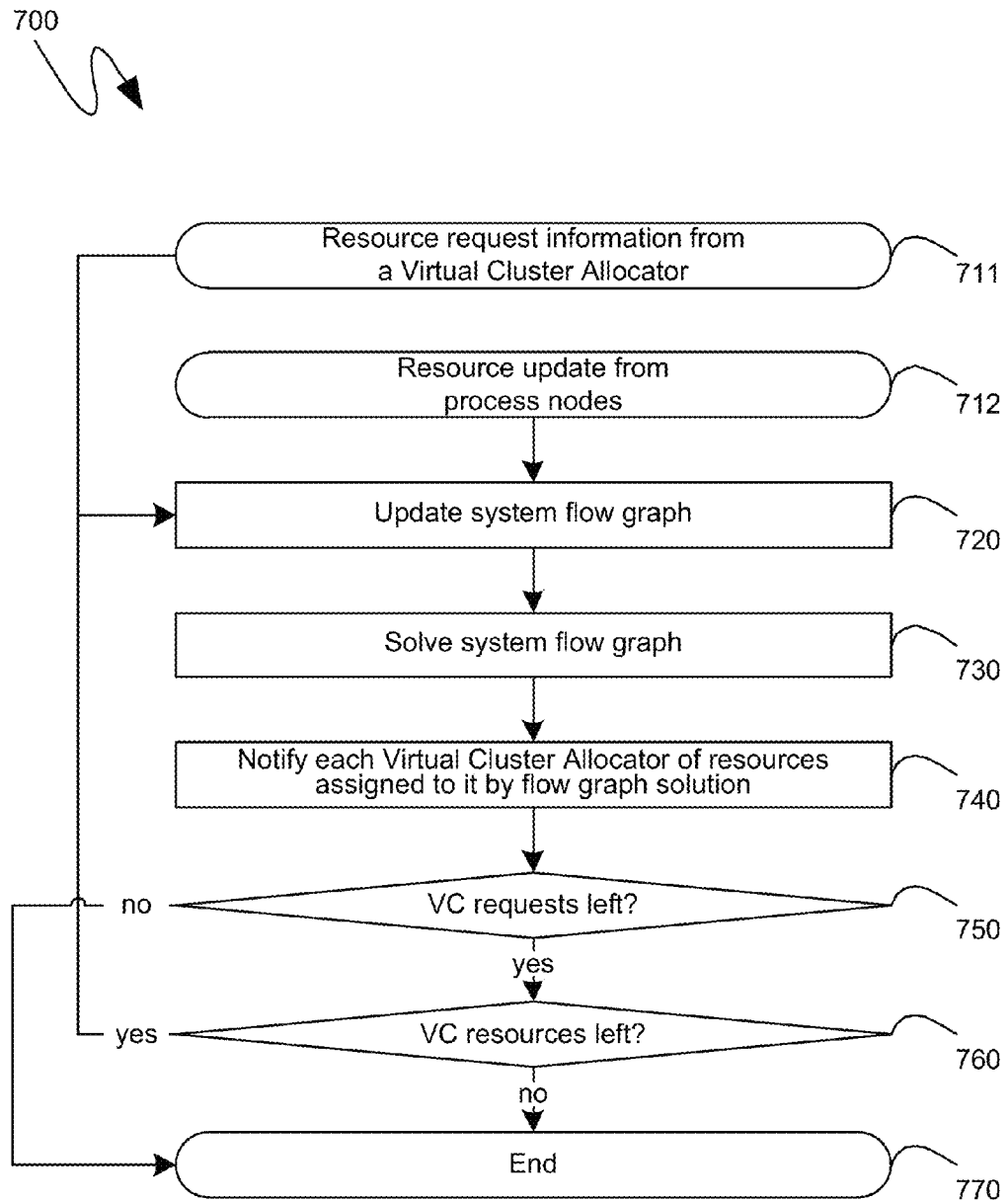
FIG. 7 is a flow diagram of an exemplary operation of another tier of a scalable scheduler.

As indicated, the virtual cluster allocator distributes those resources that are assigned to it from the resource distributor, such as at step 640 in the exemplary flow diagram 600 of FIG. 6. Turning to FIG. 7, the flow diagram 700 shown therein illustrates an exemplary series of steps that can be performed by a resource distributor in identifying which processing resources to assign to specific ones of the virtual clusters of processing resources. Initially, at step 711 the resource distributor can receive resource request information from a virtual cluster allocator or, at step 712, the resource distributor can receive updates regarding the status of one or more processing nodes or other like processing resources. The resource distributor can then build, or update, a system flow graph, at step 720, from the resource requests received from virtual cluster allocators at step 711 and the updates received from processing resources at step 712. Subsequently, at step 730, the resource distributor can solve the flow graph generated or updated at step 720. At step 740 the resources can be assigned to virtual clusters in accordance with the solution of the flow graph at step 730. The relevant virtual cluster allocators can be notified of the resources being assigned to the virtual clusters with which those virtual cluster allocators are associated.

In one embodiment, at step 750 a determination can be made as to whether there are any requests from virtual cluster allocators that have not been responded to. If, at step 750, it is determined that there are remaining requests that have not been responded to, the subsequent check can be made, at step 760, as to whether there are any resources earmarked for such a virtual cluster that can be distributed to it. If, at step 760, it is determined that there are no resources left, then the relevant processing can end at step 770. Similarly, if, at step 750, it is determined that all requests from the virtual cluster allocators have been responded to, then the relevant processing can, again, end at step 770. Conversely, if, however, it is determined at step 750 that there are requests for processing resources that have not been responded to and, at step 760, it is determined that there are resources that can still be assigned to the virtual cluster from which such requests have been received, then processing can return to step 720 and the flow graph can be updated based on the resources that were assigned at step 740 and processing can repeat in such an iterative manner.

Figure 8:
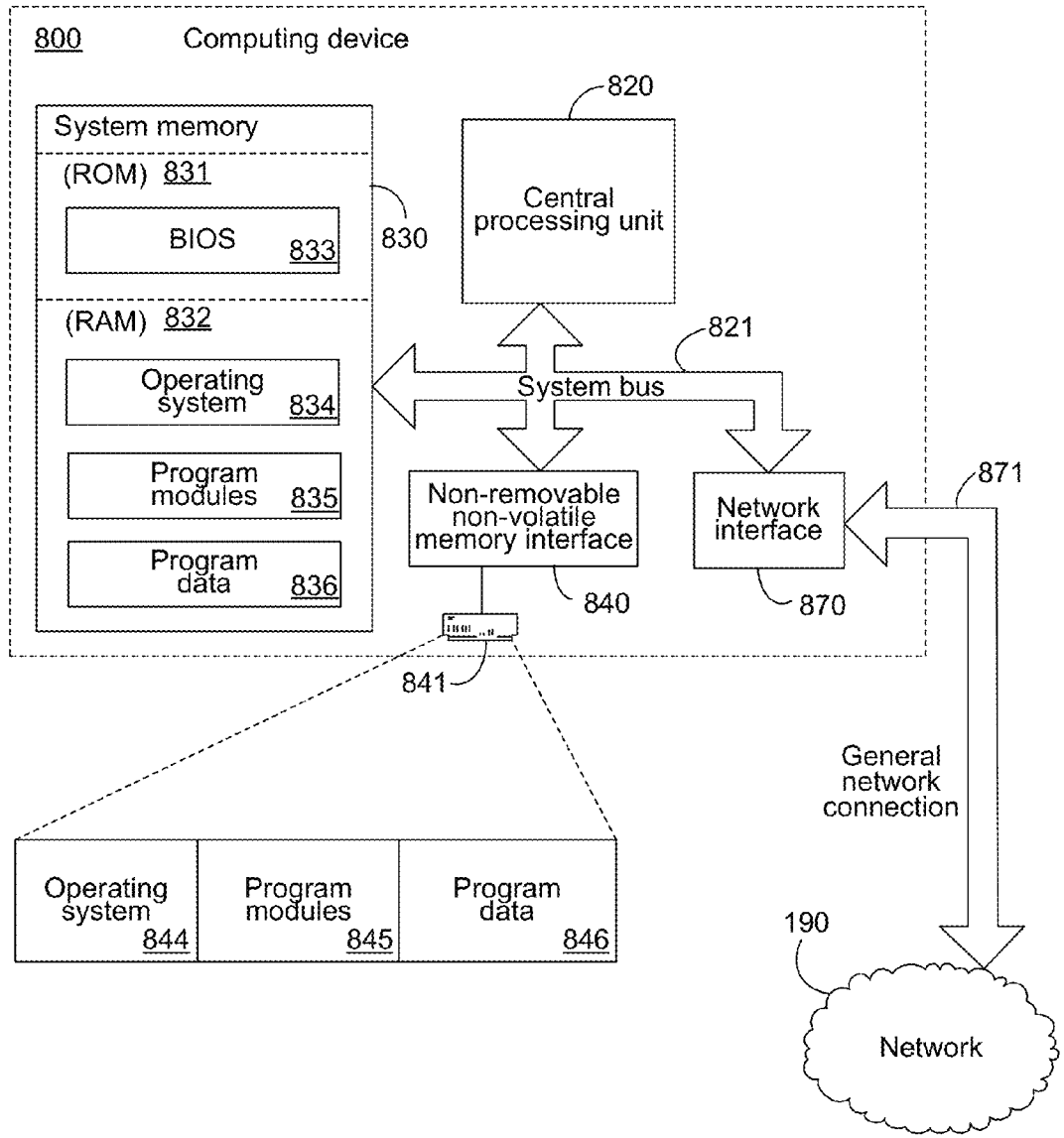
FIG. 8 is a block diagram of an exemplary computing device.

The above described mechanisms can be performed asynchronously across multiple different computing devices. For example, different computing devices can perform the tasks described as being performed by virtual cluster allocators and the tasks described as being performed by the resource distributor. Turning to FIG. 8, an exemplary computing device 800 is illustrated, comprising, in part, hardware elements that can be utilized in performing and implementing the above described mechanisms. The exemplary computing device 800 can include, but is not limited to, one or more central processing units (CPUs) 820, a system memory 830 and a system bus 821 that couples various system components including the system memory to the processing unit 820. The system bus 821 may be any of several types of bus structures including a memory bus or memory controller, a peripheral bus, and a local bus using any of a variety of bus architectures. Depending on the specific physical implementation, one or more of the CPUs 820, the system memory 830 and other components of the computing device 800 can be physically co-located, such as on a single chip. In such a case, some or all of the system bus 821 can be nothing more than silicon pathways within a single chip structure and its illustration in FIG. 8 can be nothing more than notational convenience for the purpose of illustration.

The computing device 800 also typically includes computer readable media, which can include any available media that can be accessed by computing device 800. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 800. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 800 may operate in a networked environment via logical connections to one or more remote computers. The logical connection depicted in FIG. 8 is a general network connection 871 to the network 190 described previously. The network 190 to which the exemplary computing device 800 is communicationally coupled can be a local area network (LAN), a wide area network (WAN) such as the Internet, or other networks. The computing device 800 is connected to the general network connection 871 through a network interface or adapter 870, which is, in turn, connected to the system bus 821. In a networked environment, program modules depicted relative to the computing device 800, or portions or peripherals thereof, may be stored in the memory of one or more other computing devices that are communicatively coupled to the computing device 800 through the general network connection 871. It will be appreciated that the network connections shown are exemplary and other means of establishing a communications link between computing devices may be used.

Among computer storage media, the system memory 830 comprises computer storage media in the form of volatile and/or nonvolatile memory, including Read Only Memory (ROM) 831 and Random Access Memory (RAM) 832. A Basic Input/Output System 833 (BIOS), containing, among other things, code for booting the computing device 800, is typically stored in ROM 831. RAM 832 typically contains data and/or program modules that are immediately accessible to and/or presently being operated on by processing unit 820. By way of example, and not limitation, FIG. 8 illustrates operating system 834, other program modules 835, and program data 836.

The computing device 800 may also include other removable/non-removable, volatile/nonvolatile computer storage media. By way of example only, FIG. 8 illustrates a hard disk drive 841 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840.

The drives and their associated computer storage media discussed above and illustrated in FIG. 8, provide storage of computer readable instructions, data structures, program modules and other data for the computing device 800. In FIG. 8, for example, hard disk drive 841 is illustrated as storing operating system 844, other program modules 845, and program data 846. These components can either be the same as or different from operating system 834, other program modules 835 and program data 836. Operating system 844, other program modules 845 and program data 846 are given different numbers here to illustrate that, at a minimum, they are different copies.

As can be seen from the above descriptions, a multi-tier scheduling mechanism that can be scaled to accommodate scheduling across thousands of computing devices has been presented. In view of the many possible variations of the subject matter described herein, we claim as our invention all such embodiments as may come within the scope of the following claims and equivalents thereto.

We claim:

1. One or more computer-readable memory comprising computer-executable instructions for assigning processing resources, the computer-executable instructions performing steps comprising:

receiving requests for the processing resources from one or more jobs, each job comprising one or more processes to be executed by the processing resources;

generating a flow graph comprising a source, a sink, resource nodes for each of the processing resources, job nodes for each of the one or more jobs and process nodes for each of the one or more processes;

generating at least one aggregated request from at least some of the received requests;

transmitting the at least one aggregated request;

receiving, in response to the transmitting, an assignment of at least some of the processing resources;

generating edges in the flow graph to the sink from only the resource nodes representing the assigned processing resources;

solving the flow graph; and assigning the processing resources to the one or more jobs in accordance with the flow graph solution.

2. The computer-readable memory of claim 1, wherein the computer-executable instructions for generating the flow graph comprise computer-executable instructions for generating a cluster node in the flow graph representing all of the processing resources and generating edges from the cluster node to the resource nodes.

3. The computer-readable memory of claim 1, wherein the computer-executable instructions for generating the flow graph comprise computer-executable instructions for generating at least one pod node in the flow graph, each of the at least one pod nodes representing a defined collection of the processing resources, and generating edges from the each of the at least one pod nodes to only the resource nodes that represent the processing resources in the defined collection associated with that pod node.

4. The computer-readable memory of claim 1, wherein the computer-executable instructions for generating the flow graph comprise computer-executable instructions for generating a static pool node representing guaranteed processing resources and a dynamic pool node representing opportunistic processing resources.

5. The computer-readable memory of claim 4, wherein the computer-executable instructions for generating the flow graph comprise computer-executable instructions for assigning capacities to each edge between the static pool node and individual ones of the job nodes based on a difference between a quantity of guaranteed processing resources assigned to each job represented by the individual ones of the job nodes and a quantity of guaranteed processing resources currently utilized by the each job represented by the individual ones of the job nodes.

6. The computer-readable memory of claim 4, wherein the computer-executable instructions for solving the flow graph comprise computer-executable instructions for iteratively solving the flow graph; and wherein further the computer-executable instructions for assigning the processing resources are executed after each iteration.

7. The computer-readable memory of claim 6, wherein the computer-executable instructions for generating the flow graph comprise computer-executable instructions for assigning different capacities to each edge between the dynamic pool node and individual ones of the job nodes at each iteration to increase a quantity of opportunistic processing resources assigned with each iteration.

8. The computer-readable memory of claim 1, wherein the computer-executable instructions for generating the flow graph comprise computer-executable instructions for assigning priorities to at least some of the edges terminating at at least some of the resource nodes in accordance with a health of processing resources represented by those resource nodes.

9. One or more computer-readable memory comprising computer-executable instructions for assigning processing resources, the computer-executable instructions performing steps comprising:

receiving aggregated resource requests, identifying at least some of the processing resources, from one or more virtual cluster allocators, each of the virtual cluster allocators being associated with a virtual cluster comprising dynamically assigned ones of the processing resources;

generating a flow graph comprising a source, a sink, virtual cluster nodes for each of the virtual clusters from whose virtual cluster allocators the aggregated requests were received, aggregated resource request nodes for each of the received aggregated resource requests and process nodes for each of the identified processing resources;

solving the flow graph; and assigning the identified processing resources to the virtual clusters in accordance with the flow graph solution.

10. The computer-readable memory of claim 9, comprising further computer-executable instructions for receiving status updates from the processing resources.

11. The computer-readable memory of claim 10, wherein the computer-executable instructions for generating the flow graph comprise computer-executable instructions for assigning a capacity to each edge between the process nodes and the sink based on a difference between a quantity of high priority processes that a process resource, associated with the process node, can execute and a quantity of high priority processes that that process resource is executing.

12. The computer-readable memory of claim 9, comprising further computer-executable instructions for updating the flow graph in accordance with the assigning and solving the updated flow graph if at least some of the aggregated resource requests have not had processing resources assigned in response to them and if processing resources remain available for assigning.

13. The computer-readable memory of claim 9, wherein the computer-executable instructions for generating the flow graph comprise computer-executable instructions for generating edges between the source and each of the virtual cluster nodes, between the virtual cluster nodes and the aggregated resource request nodes representing the aggregated resource requests received from a virtual cluster represented by the virtual cluster nodes, and between the aggregated resource request nodes and the process nodes representing the processing resources identified by the aggregated resource requests represented by the aggregated resource request nodes.

14. The computer-readable memory of claim 13, wherein the computer-executable instructions for generating the flow graph comprise computer-executable instructions for assigning capacities to the edges between the virtual cluster nodes and the aggregated resource requests based on a difference between a quantity of high priority processes allowed to a job whose resource requests are aggregated into the aggregated resource requests represented by the aggregated resource request nodes and a quantity of high priority processes currently utilized by the job.

15. A system of assigning processing resources comprising:

one or more processing units;

a first virtual cluster allocator associated with a first virtual cluster comprising dynamically assigned ones of the processing resources, the first virtual cluster allocator comprising computer-executable instructions being executed by at least some of the one or more processing units;

a second virtual cluster allocator associated with a second virtual cluster, differing from the first virtual cluster, the second virtual cluster comprising dynamically assigned others of the processing resources, the second virtual cluster allocator comprising computer-executable instructions being executed by at least some of the one or more processing units; and a resource distributor for performing the dynamic assignment of the processing resources to the first and second virtual clusters in accordance with aggregated requests received from the first and second virtual cluster allocators and in accordance with status information received from the processing resources, the resource distributor comprising computer-executable instructions, which, when executed by at least some of the one or more processing units, perform steps comprising:
  receiving aggregated resource requests, identifying at least some of the processing resources, from the first and second virtual cluster allocators;
  generating a flow graph comprising a source, a sink, virtual cluster nodes for each of the first and second virtual clusters allocators, aggregated resource request nodes for each of the received aggregated resource requests and process nodes for each of the identified processing resources;
  solving the flow graph; and
  assigning the identified processing resources to the first and second virtual clusters in accordance with the flow graph solution.

16. The system of claim 15, further comprising a proxy for multiplexing between job managers of jobs seeking access to the processing resources and the first and second virtual cluster allocators based on an assignment of the jobs to specific ones of the first and second virtual clusters.

17. The system of claim 15, further comprising a job manager for each job seeking access to the processing resources, the job manager executing processes of its associated job in accordance with assignments of the processing resources received from the first virtual cluster allocator if its associated job is assigned to the first virtual cluster or received from the second virtual cluster allocator if its associated job is assigned to the second virtual cluster.

18. The system of claim 15, further comprising processing resources, each processing resource comprising at least one execution slot, and at least one opportunistic execution slot, wherein both the at least one execution slot and the at least one opportunistic execution slot being assigned by the first and second virtual cluster allocators and the resource distributor.

19. The system of claim 15, wherein each of the first and second virtual cluster allocators comprise computer-executable instructions performing steps comprising:
  receiving requests for the processing resources from one or more jobs, each job comprising one or more processes to be executed by the processing resources;
  generating a flow graph comprising a source, a sink, resource nodes for each of the processing resources, job nodes for each of the one or more jobs and process nodes for each of the one or more processes;
  generating at least one aggregated request from at least some of the received requests;
  transmitting the at least one aggregated request to the resource distributor;
  receiving, in response to the transmitting, an assignment of at least some of the processing resources from the resource distributor;
  generating edges in the flow graph to the sink from only the resource nodes representing the assigned processing resources;
  solving the flow graph; and
  assigning the processing resources to the one or more jobs in accordance with the flow graph solution.

20. The system of claim 15, wherein at least some of the one or more processing units provide at least some of the processing resources being assigned by the system.

* * * * *